United States Patent [19]

Libes et al.

[11] Patent Number: 5,160,065
[45] Date of Patent: Nov. 3, 1992

[54] PROTECTIVE STRUCTURE FOR A SHUT-OFF VALVE OF A TOXIC GAS CONTAINER

[75] Inventors: Jean-Louis Libes, Villepreux; Georges Laureau, Champigny-sur-Marne, both of France

[73] Assignee: L'Air Liquide, Societe Anonyme pour l'Etude et l'Exploitation des Procedes Georges Claude, Paris, France

[21] Appl. No.: 849,275

[22] Filed: Mar. 10, 1992

Related U.S. Application Data

[63] Continuation of Ser. No. 654,756, Feb. 13, 1991.

[30] Foreign Application Priority Data

May 9, 1990 [FR] France .................. 90 05778

[51] Int. Cl.⁵ .............................................. B65D 25/00
[52] U.S. Cl. .................................. 220/724; 220/725; 137/382
[58] Field of Search .................. 220/725, 724, 256; 137/382; 206/523, 524, 588

[56] References Cited

U.S. PATENT DOCUMENTS

| | | | |
|---|---|---|---|
| 1,413,502 | 4/1922 | Steinmetz | 220/256 |
| 2,996,213 | 8/1961 | Mitchell et al. | 220/85 P |
| 3,323,541 | 6/1967 | Schneider, Jr. et al. | 220/85 P |
| 3,756,450 | 9/1973 | Crose, Jr. | 220/85 P |
| 4,483,163 | 11/1984 | Carlyle | 70/165 |
| 4,624,495 | 11/1986 | Marsh | 294/31.2 |
| 4,905,855 | 3/1990 | Troiano et al. | 220/408 |

Primary Examiner—Stephen Marcus
Assistant Examiner—S. Castellano
Attorney, Agent, or Firm—Curtis, Morris & Safford

[57] ABSTRACT

A protective structure for a shut-off valve of a transportable toxic gas container having a metallic hood unlockably mounted on the container around the shut-off valve, comprises a cover made of a shock absorbent material, which is unlockably mounted, typically by a hoop, on the hood and entirely closing the latter. The cover includes an inner recess substantially following the outlines of the hood and an end area resting on the area of the container at the base of the hood.

9 Claims, 1 Drawing Sheet

PROTECTIVE STRUCTURE FOR A SHUT-OFF VALVE OF A TOXIC GAS CONTAINER

This application is a continuation of application Ser. No. 07/654,756, filed Feb. 13, 1991.

BACKGROUND OF INVENTION (a) Field of the Invention

The present invention concerns protective structures for shut-off valves of transportable toxic gas containers, of the type comprising a cylindrical metallic hood unlockably mounted on the container, around the shut-off valve.

(b) Description of Prior Art

For the transportation of containers, typically bottles, containing toxic gases, in particular arsine or phosphine, safety measures have led to provide, all around the valve for the distribution of the gas contained in the container, a hood, of generally cylindrical configuration, made by stamping a sheet iron and screwed on a sleeve which is unitary with the container at the level of the base of the valve. To complete this protection it has also been proposed to place the containers, during transportation, in reinforced baskets which may contain one or more containers and including a lockable door, according to a difficult arrangement, which is not easy to put into operation, and which considerably raises the costs of transportation of the gas.

The Applicant has realized, from an examination of the accident and incident reports resulting from the falls of containers, for example from the platform of a truck travelling at 80 Km/h, that the possibilities of leaks never took place by reason of a break down or crack in the container itself, but always because of damages caused at the level of the valve.

SUMMARY OF INVENTION

Consequently, it is an object of the present invention to propose a protective structure for a valve of a toxic gas container, of simple construction, low manufacturing and utilization costs, which is easily reusable and give excellent results for a large scale of bad conditions of use or untimely falls.

For this purpose, according to a characteristic of the invention, the protective structure comprises a cover of shock absorbent material unlockably mounted on the metallic hood and completely enclosing the latter.

According to a more particular aspect of the invention, the cover includes a main portion of generally tubular configuration having an end part closed by a bottom and an opposite open end part outwardly flaring so as to extend on the container to cover the same on a peripheral area of the container adjacent the base of the hood, in mounted position on the container.

BRIEF DESCRIPTION OF DRAWINGS

Other characteristics and advantages of the present invention would appear from the description which follows of a preferred embodiment, given by way of illustration but without intention to limit the scope thereof, with respect to the: annexed drawings, in which.

DESCRIPTION OF PREFERRED EMBODIMENTS

Figure 4:
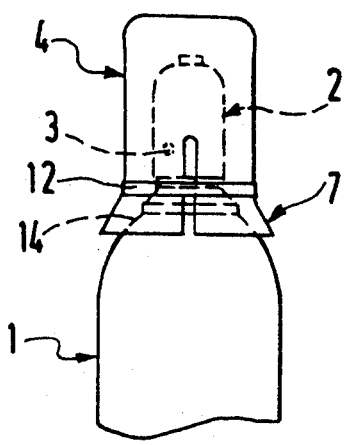
FIG. 4 is a view showing the cover in position on the head of a gas bottle.

With reference to FIG. 4, there is seen a gas container, such as a bottle 1, on the head thereof is placed, in known manner, a metallic hood 2 completely surrounding the gas distribution valve of the container and provided, in the vicinity of its base, with at least one vent 3 to enable the screwing of the hood on the collar of the bottle and to take into account variations of temperature of the air contained inside the hood.

Figure 3:
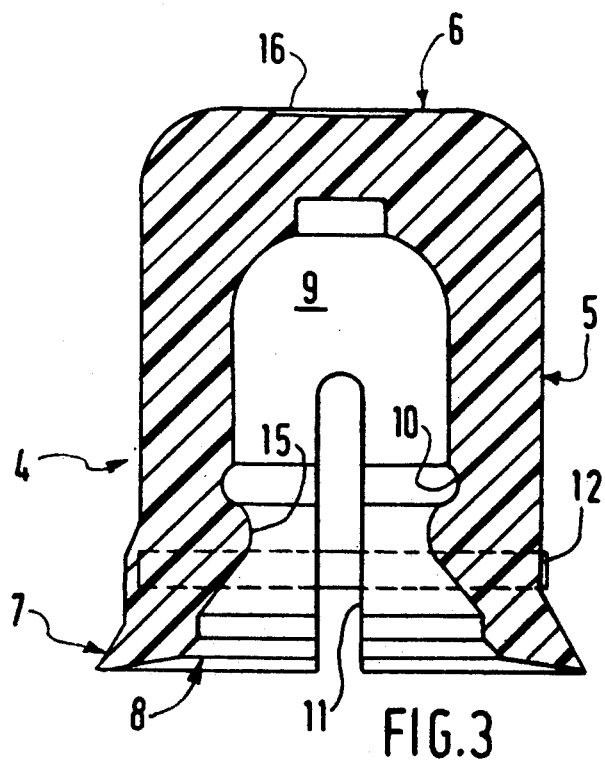
FIG. 3 is a longitudinal cross-section according to line III—III of FIG. 1.

According to the invention, a protective structure is completed by a cover 4 including, as better seen on FIG. 3, a main part 5 of generally tubular configuration, closed at one end by means of a bottom 6, and an opposite open end part outwardly flaring in the form of a skirt 7, providing a shape opening 8 for communication with an inner recess 9 shaped so as to substantially follow the outlines of the hood 2. The recess 9 includes an annular outwardly radially extending channel 10, intended to be placed opposite vent 3 of the hood 2. The lateral wall of the cover 4 has at least one, typically two diametrically opposite slits 11 formed therein, opening in the flaring end 7 and axially extending to substantially half the height of the cover 4.

Figure 1:
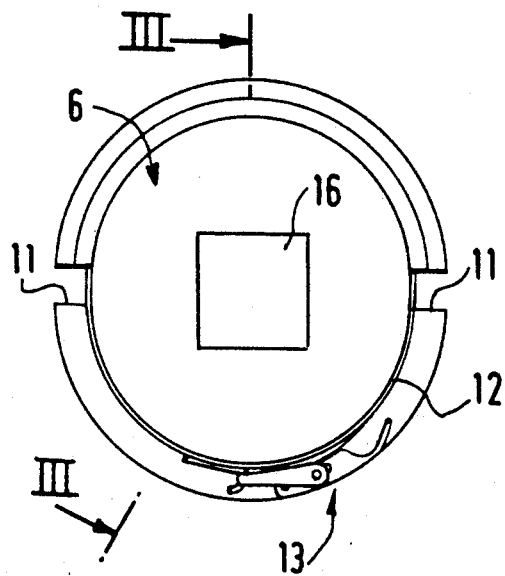
FIGS. 1 and 2 are respectively top and elevation views of a protective cover according to the invention.
Figure 2:
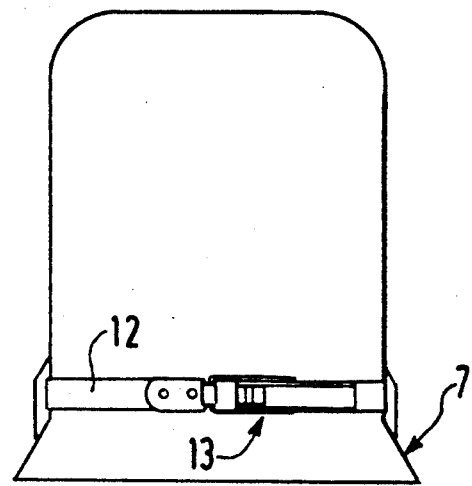

The latter includes, at the level of the area for connection between the main part 5 and the end area 7, a hooping means including a hooping band 12, in which a portion of an arc is integral with the thickness of the cover portion, as well illustrated in FIG. 1, and an adjustable lever tightening device 13, in an arrangement thus made permanent.

As it is well seen in FIG. 4, the cover 4 is introduced with a light force on the hood 2 until the upper end of the latter abuts the bottom part of the recess in the cover, with the inner face 8 of the end area 7 resting against the peripheral area, or arch 14 of the container adjacent the hood 2, after which the hooping means 12,13 is operated- to tighten the base of the cover and to ensure, by means of internal radial projections 15 cooperating with the coupling of the hood 2, a locking of the cover 4 on the hood 2 and a contact under pressure of the end zone 7 on the arch 14, thus protecting the entire head area of the container 1 against shocks.

The cover 4 is advantageously made of a single piece in a shock resistant thermo-plastic material, for example of polypropylene foam, or preferably of high density polyurethane with a micro-porous skin formed by molding at least on the outer wall of the cover. The average thickness of the cover is of the order of 40 to 45 mm.

Tests were made with bottles provided with such a cover by allowing them to fall from a platform located at 1.55 meters from the round, from a truck travelling at 80 Km/h have established the efficiency of this protective structure. The cover 4, of small weight (lower than 1 kilo), has nearly no contribution to the general congestion of the container, is very easy to mount and to be removed, can be reutilized a large number of times, requires no maintenance, do not hide the notes placed on the container and permits the molding in the body of the bottom part 6, of a sign 16 indicating the name of the producer or distributor.

The protective structure according to the invention is particularly suitable for the transportation by the container of extremely toxic gases such as arsine, phosphine, germane, selenized hydrogen, diborane, chlorine, hydrogen cyanide or also hydrogen sulfide, hydrogen chloride.

We claim:

1. A protective structure for a valve of a transportable gas container of the type comprising a metallic hood releasably mounted on the container so as to enclose the valve, further comprising a cover formed of resilient plastic material having an inner recess which opens outwardly through an annular end portion of the cover, the inner recess having a surface configuration substantially matching the outer shape of the hood, and tightening means mounted on the cover for securably mounting the cover on the hood such that the hood is received in the inner recess of said plastic material and is in abutting contact with the surface of said inner recess and said cover is in pressure contact with said gas container.

2. The structure of claim 1, wherein the annular end portion of the cover extends over an area of the container surrounding the hood and is in contact engagement therewith when the cover is mounted on the hood.

3. The structure of claim 2, wherein the annular end portion of the cover has a shape substantially matching the shape of said area of the container surrounding the hood.

4. A protective structure for a valve of a transportable gas container of the type comprising a metallic hood releasably mounted on the container so as to enclose the valve, further comprising a cover formed of resilient plastic material having an inner recess which opens outwardly through an annular end portion of the cover, the inner recess having a surface configuration substantially matching the outer shape of the hood, said surface configuration of said recess is provided with locking means for retentive cooperation with the hood, and tightening means mounted on the cover for securably mounting the cover on the hood such that the hood is received in the inner recess of said cover and is in abutting contact with the surface of said inner recess.

5. The structure of claim 1, wherein the tightening means includes at least a hooping band adjacent the annular end portion.

6. The structure of claim 5, wherein the cover is made of a single piece of cellular plastic material and is formed with at least one slot extending longitudinally over at least the annular end portion.

7. The structure of claim 6, wherein the hooping band is at least partly embedded in a peripheral portion of the cover.

8. The structure of claim 1, wherein the hood is formed with a vent and an inner surface of the recess in the cover is provided with a circumferential groove facing the vent when the cover is mounted on the hood.

9. The structure of claim 2, wherein the container is a cylindrical gas cylinder having an end portion carrying the valve and the hood, and wherein the cover has a substantially cylindrical shape, the annular end portion flaring outwardly to substantially encompass the end portion of the cylinder in resilient contact engagement therewith when the cover is mounted on the hood.

* * * * *